(12) United States Patent
Morin et al.

(10) Patent No.: US 8,188,969 B2
(45) Date of Patent: May 29, 2012

(54) DUAL POINTER MANAGEMENT METHOD USING COOPERATING INPUT SOURCES AND EFFICIENT DYNAMIC COORDINATE REMAPPING

(75) Inventors: Philippe Morin, San Jose, CA (US); Luca Rigazio, San Jose, CA (US)

(73) Assignee: Panasonic Corporation, Osaka (JP)

( * ) Notice: Subject to any disclaimer, the term of this patent is extended or adjusted under 35 U.S.C. 154(b) by 324 days.

(21) Appl. No.: 12/687,930

(22) Filed: Jan. 15, 2010

(65) Prior Publication Data

US 2010/0328206 A1    Dec. 30, 2010

Related U.S. Application Data

(60) Provisional application No. 61/220,721, filed on Jun. 26, 2009.

(51) Int. Cl.
*G09G 5/00* (2006.01)

(52) U.S. Cl. .................................... 345/156; 345/173

(58) Field of Classification Search .................. 345/156, 345/173–179
See application file for complete search history.

(56) References Cited

U.S. PATENT DOCUMENTS

| | | | |
|---|---|---|---|
| 5,777,615 A | 7/1998 | Barber | 345/334 |
| 6,204,837 B1 | 3/2001 | Smith | 345/157 |
| 2005/0176505 A1 | 8/2005 | Stanley | |
| 2005/0179655 A1 | 8/2005 | Ludwig | |
| 2006/0090022 A1 | 4/2006 | Flynn et al. | |
| 2006/0143571 A1 | 6/2006 | Chan | |
| 2009/0184936 A1 | 7/2009 | Algreatly | |

*Primary Examiner* — Ricardo L Osorio

(74) *Attorney, Agent, or Firm* — Harness, Dickey & Pierce, P.L.C.

(57) ABSTRACT

The pointer management technology establishes a protocol and method for dual pointer management in both absolute input mode and relative input mode. The method defines a set of properties/constraints for contextual dynamic remapping between input sensor coordinates and target screen coordinates. The remapping of the left pointer (respectively the right pointer) depends on the position of the right pointer (respectively the left pointer) in the target screen space. This interdependence enables a more flexible and more powerful interaction as it exploits the contextual layout to re-estimate the remapping transformations at each instant.

31 Claims, 5 Drawing Sheets

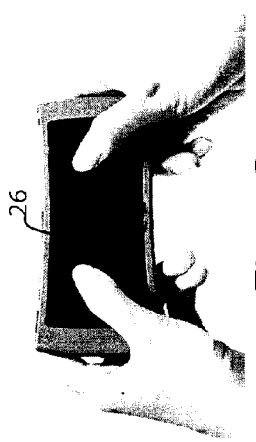
Fig. 1A
Fig. 1B
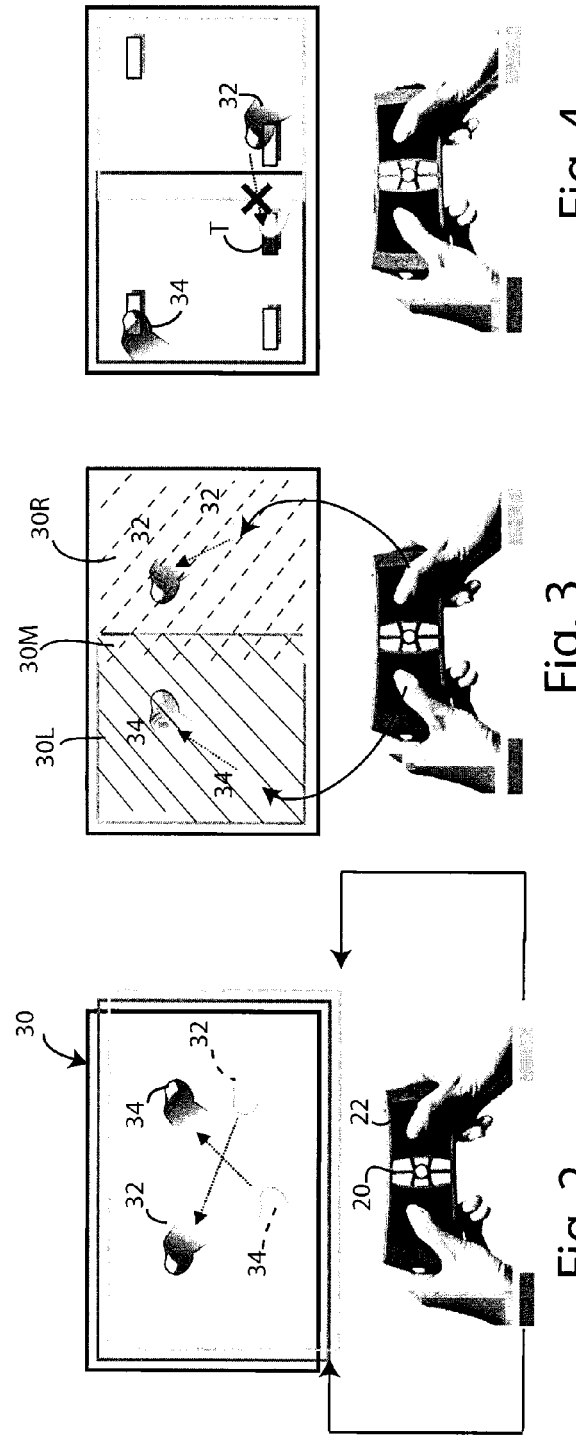
Fig. 2
Fig. 3
Fig. 4

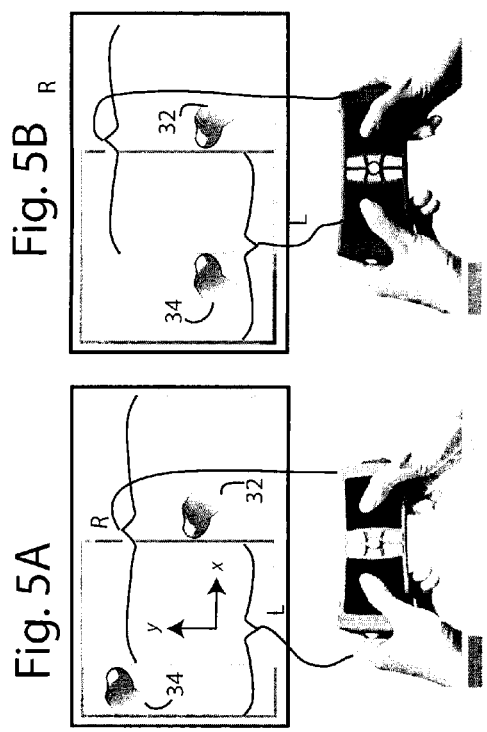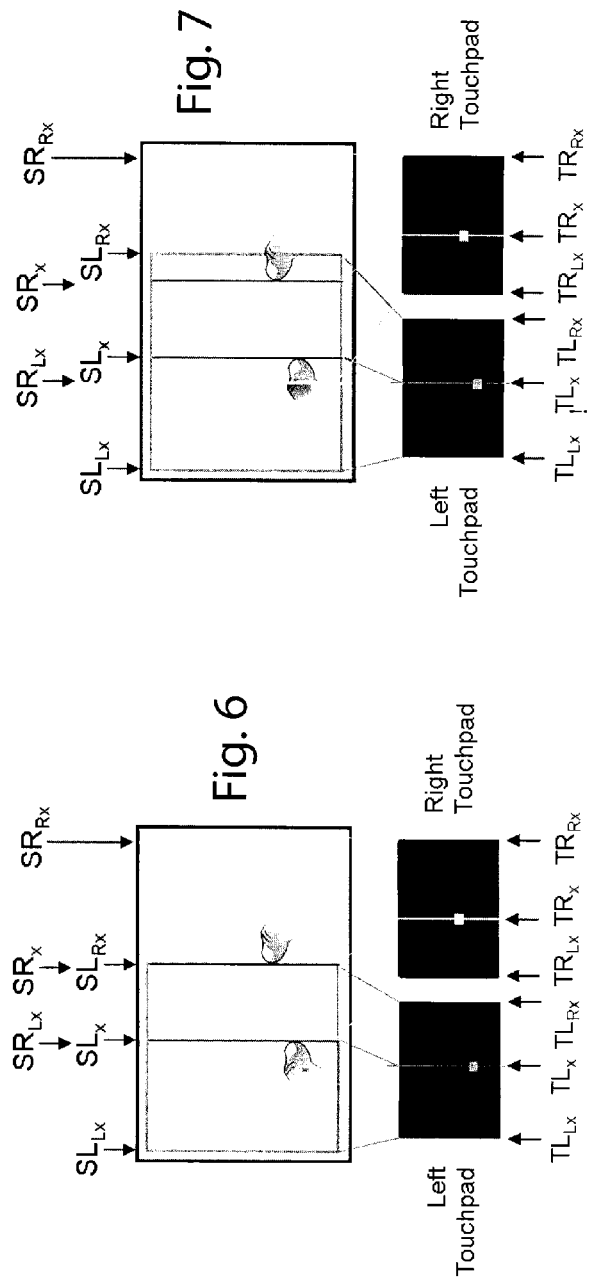

DUAL POINTER MANAGEMENT METHOD USING COOPERATING INPUT SOURCES AND EFFICIENT DYNAMIC COORDINATE REMAPPING

BACKGROUND

The present invention relates generally to methods, controllers and control apparatuses for generating and displaying pointers or cursors on a display system in response to input from an input device. More particularly, the invention relates to methods, controllers and control apparatuses that respond to plural input sources and thereby generate plural pointers or cursors.

A variety of new wireless or corded controllers providing new and advanced interaction methods are being introduced for consumer electronics products. The new trend aims at breaking away from the traditional button-based approach and at enabling a new user experience through the use of multiple sensors such as touchpads, touch screens, gyroscopes, accelerometers, capacitive sensors and the like. In the television arena, this trend is a response in part for new application markets linked to Internet-based services, multimedia entertainment and gaming that are being deployed.

One common and universal interaction needed for applications relates to the ability to point and select elements displayed on a graphical user interface of a display system. This type of interaction relies on the use of a graphical pointer or cursor that the user can control via a touch screen, touchpad or gyroscopic input, for instance. Most pointer-based interaction systems use one single pointer and, in effect, mimic the interaction that takes place in the computer world with a mouse pointer.

Looking at its popular and widespread adoption, the single pointer approach has certainly proven its convenience and value over the last past decades. However, it is argued here that many tasks could greatly benefit from a dual pointer interaction to provide users with added convenience and increased speed of interaction. In dual mode interaction, users would typically use both hands (each hand controlling one pointer). Targeted tasks for improvement include in particular:

text entry using a virtual keyboard displayed on the interface; and multiple object selection among a collection of objects displayed on the interface.

Dual pointer interaction can be implemented simply by using two input sources (e.g. two touchpads) and by managing the pointers independently (in either absolute or relative input mode). Independent methods include basic pointer overlay on the whole interactive screen (i.e. two pointers on a common area) or basic split of the interaction area shown on a display in two static sub-areas (i.e. one area defined for each pointer).

However, independent dual pointer management approaches have drawbacks and limitations when it comes to convenience, usability and/or precision of designation. These limitations are linked to two fundamental interaction observations. First, it is confusing for users to control pointers that can cross each other. A pointer controlled with the right hand should preferably remain on the right hand-side of the left hand operated-pointer and vice-versa. Second, it may be frustrating for users to force them to use the left pointer for one set of actions and to use the right hand for another set of actions (e.g. a split keyboard) in the case where a pointer is confined to a specific area.

This invention effectively overcomes those limitations using a novel inter-dependent dual pointer management method.

SUMMARY OF THE INVENTION

The technology disclosed herein enables a more intuitive, more convenient and efficient interaction for dual pointer-based input by defining a novel pointer management method that uses a cooperative model between the two input sources (e.g. two touchpads, multi-touch touchpad with two input areas, two joysticks) via an efficient contextual dynamic coordinate remapping approach.

The approach enforces non-crossing left and right (or top and bottom) pointers while enabling users to point at any objects with either one of the pointers at any time, thus bringing convenience and intuitiveness to the interaction. It also enables users to interact at greater speed since pointing movements can be more readily optimized by the user for each specific situation.

The disclosed embodiments target particular tasks such as text input and multiple object selection, although other applications are possible with the technology disclosed herein. The dual pointer concept can be extended to multi-pointer applications having more than two input sources and more than two pointers.

As will be more fully explained herein, the disclosed technology has numerous advantages, including but not limited to the following:

1. Defines dual pointer management protocol that enforces non-crossing pointers (e.g. left and right pointers),
  2. Targets principally dual absolute pointer modes but core principles applicable to relative pointing as well,
  3. Defines an inter-dependent remapping process that uses left and right pointer information to convert input coordinates (e.g. from one touchpad) to output coordinates (e.g. to screen),
  4. The interdependent remapping parameters are re-estimated after each left and/or right finger activity (contextual remapping as opposed to fixed remapping),
  5. The remapping functions provide motion continuity and smoothness via contextual stickiness at the input sensor edges,
  6. The method supports smooth switching from one-hand operation to two-hand operation and vice-versa, In accordance with one aspect, the disclosed technology provides an apparatus for generating plural pointers on a display screen. The apparatus comprises a multi-position input system receptive of position input data from a plurality of input devices, and a pointer generation system that generates plural pointers for display on said display screen each at a different pointer location. The apparatus further comprises a mapping integrator processor configured to compute said different pointer locations by taking into account the position input data from all of said plurality of input devices in computing each pointer location. The mapping integrator processor being further configured to compute said different pointer locations such that each location lies on a different side of a dynamic boundary that is adjusted by the processor based on knowledge of the input data from said plurality of input devices.

In accordance with another aspect, the disclosed technology provides a method of generating plural pointers on a display screen that are responsive to plural input devices. According to the method, a first position signal is received from a first input device; a second position signal is received from a second input device; additional position signals are received if more than two input devices are provided. The position signals are electronically processed to calculate first and second pointer positions within a predefined display coordinate system associated with a display screen. Additional pointer positions may be calculated if more than two position signals are received. The calculated pointer positions are different from one another and each is based on both of at least the first and second position signals. First and second pointers are generated on the display screen, the first pointer being displayed at the first pointer position and the second pointer being displayed at the second pointer position. Additional pointers may be generated if more than two pointer positions were calculated.

In accordance with the method, the processing step that calculated the first and second pointer positions is performed such that the first and second pointer positions are confined to different sides of a dynamic boundary within the display coordinate system, wherein the dynamic boundary is computationally adjusted based on the first and second position signals.

BRIEF DESCRIPTION OF THE DRAWINGS

FIG. 1A is an exemplary remote control device having two separate, clickable touchpads, useful in implementing the control technology of the invention;

FIG. 1B is an exemplary remote control device having a single multi-touch, clickable touchpad, useful in implementing the control technology of the invention;

FIG. 2 is an exemplary illustration of the control device of FIG. 1A, showing use in controlling plural pointers that are mapped to the same screen area of the display screen. This figure illustrates one reason why user confusion can result in dual pointer systems;

FIG. 3 is an exemplary illustration of the control device of FIG. 1A, showing use in controlling plural pointers where the left and right pointers are confined to two fixed sub-areas of the screen; sub-areas may or may not overlap;

FIG. 4 is an exemplary illustration of the control device of FIG. 1A, showing an example of proximity conflict in the case where the left and right pointers are confined to two fixed sub-areas of the screen;

FIGS. 5A and 5B are exemplary illustrations of the control device of FIG. 1A, illustrating how the addressing space for the right hand side pointer is bound on or confined to the left side by the left hand side pointer x-axis position; and the addressing space for left hand side pointer is bound on or confined to the right side by the right hand side pointer x-axis position, where the boundaries move dynamically;

FIG. 6 is an exemplary illustration of the control device of FIG. 1A, showing boundary conditions for a first embodiment of the dual pointer management technique;

FIG. 7 is an exemplary illustration of an alternate embodiment of the dual pointer management technique where the dynamic split permits mild pointer overlay;

DESCRIPTION OF THE PREFERRED EMBODIMENTS

Figure 9:
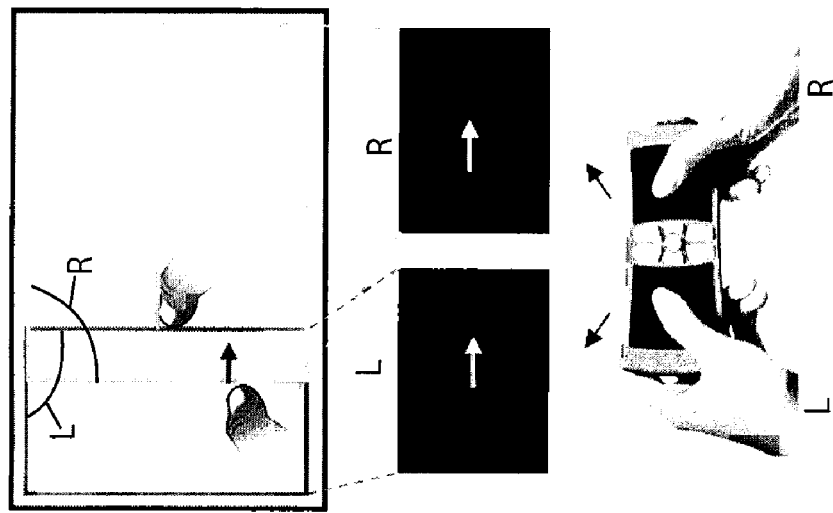
FIG. 9 is an exemplary illustration of another embodiment of the dual pointer management technique where, in relative mode, the displacement offset in the screen space is more important for the right pointer vis-à-vis the left pointer due to larger dynamic area of the right interactive area.
Figure 8:
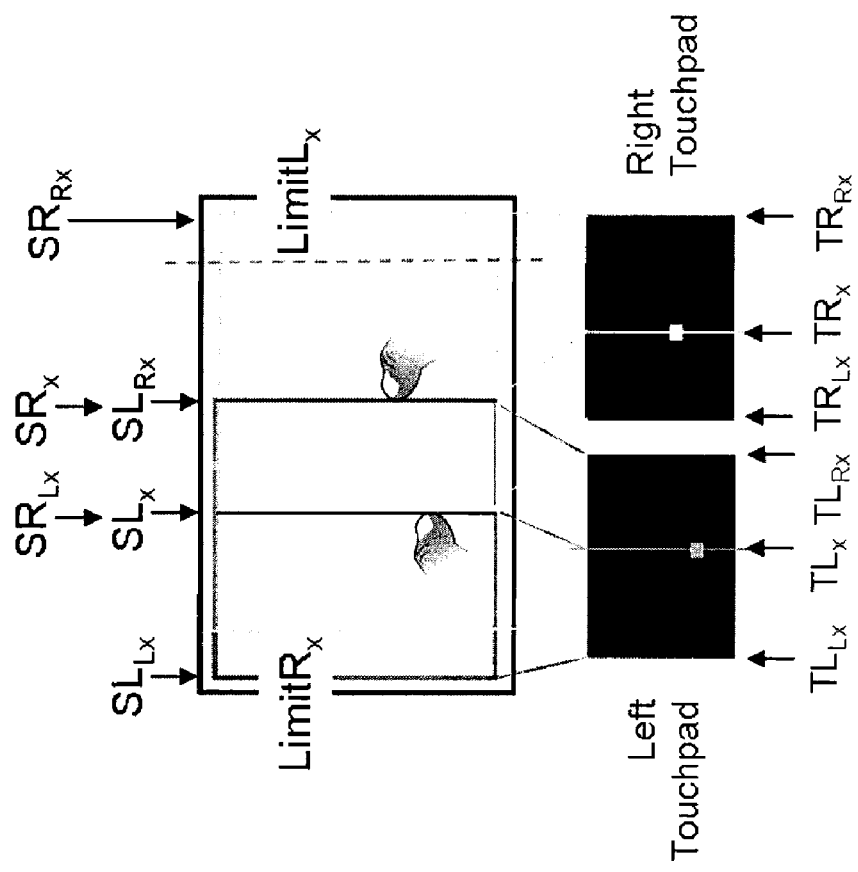
FIG. 8 is an exemplary illustration of yet another embodiment of the dual pointer management technique where the dynamic split enforces outer limit restrictions to enhance effective pointer resolution.

The technology of the innovation can be used with a variety of input devices enabling dual pointer or multi-pointer input. For illustration purposes, two exemplary input devices are shown in FIGS. 1A and 1B. The device illustrated in FIG. 1A is a remote controller that features two separate clickable touchpads. The device illustrated in FIG. 1B is a remote controller that features a single multi-touch surface that can simultaneously discriminate among multiple touch inputs. It will be appreciated that these are simply two possible exemplary embodiments; other embodiments using other types of control sensors are possible. For example, a dual pointer device may be implemented using multiple joysticks, trackballs, proximity sensors or the like.

To better understand the concepts involved in the innovation, a discussion of various pointer management methods will now be presented. Pointer management methods rely on the type of mapping that exists between the pointing device space of (e.g. touchpad surface) and the target area of the screen. This disclosure will focus initially on absolute pointing methods but the basic concept introduced here can be pertinent to relative pointing as well. The innovation employs a dynamic approach to dual pointer or multi-pointer management, in contrast to conventional approaches (overlay method, basic split method), which each use a static strategy.

As will be understood from the description herein, the innovative techniques described here apply to any input device(s) providing two or more separate addressing spaces; this can be implemented, for example, using two or more separate sensors (e.g. two touchpads of FIG. 1A) or using a single sensor with two or more separate areas (one multi-touch touchpad of FIG. 1B) with two logical areas.

Referring to FIG. 1A, the exemplary remote controller features two clickable touchpads 20, 22 and a set of application-definable buttons 24. Device orientations (landscape, portrait) and hand positions are automatically detected via capacitive and accelerometer sensors. Referring to FIG. 1B, the exemplary remote controller features a single, multi-touch touchpad 26. If desired, certain designated regions on the touchpad 26 can be assigned to a set of application-definable buttons that, when tapped, function in the same manner as the buttons 24 of the FIG. 1A embodiment.

Problems with Overlay Pointer Methods

As seen in FIG. 2, the overlay method uses a 1-to-1 mapping between a target screen area 30 and any of the two touchpad areas 20, 22. The user can point to any location in the screen area by using indifferently the right or left pointer. (In FIG. 2, and in subsequent FIGS. 2-9, the right and left pointers are graphically depicted as partial images of the right and left human thumbs: right pointer 32 and left pointer 34). The major drawback of the overlay method is that the left and right pointers can easily cross each other, which may leave the user somewhat confused at times. Another issue is the unfavorable overall designation resolution because each touchpad covers the same screen area. In the horizontal space, two touchpad widths (i.e. for left and right touchpad) are used to map into two screen widths.

Problems with Split Pointer Methods

As seen in FIG. 3, the basic split method typically creates a 1-to-1 mapping between each touchpad and a sub-portion of the target screen area. In effect, the right hand side pointer 32 controlled by the right hand is confined to the right hand side sub-portion 30R of the screen area; respectively the left hand side pointer 34 controlled by the left hand is confined to the left hand side sub-portion 30L of the screen area. Using this method, the left and right pointer will not cross each other, although both pointers can coexist in the middle 30M without crossing. In addition, the split pointer method improves the designation resolution because two touchpads widths are mapped to one target screen area widths. Thus, the basic split method has therefore clear advantages over the overlay method. However, experiments have shown that users experience some uneasiness at times due to a perceived proximity conflict illustrated in FIG. 4.

As shown in FIG. 4, there are times when the user is naturally found wanting to use the right pointer instead of the left pointer, for target proximity reasons; but the fixed split imposed by the fixed sub-portioning prevents it, thus creating a mental proximity conflict. Although it would be more natural to most users to use the right pointer 32 to access the input target T, the right pointer cannot be moved to that location as it is confined to the right side portion of the display.

Solution to Aforementioned Problems

The present innovation uses a novel dynamic split approach to answer the needs mentioned above and which are:

- Non-crossing left and right pointers
- High Designation resolution
- Capability to use any finger to point at any target coordinates With the novel dynamic split approach, the screen addressing area for the left and right pointers is not statically defined, but is rather adjusted dynamically based on the actual positions of those pointers. As shown FIGS. 5A and 5B, the addressing space R for the right hand side pointer is bound on the left side by the left hand side pointer x-axis position. Respectively, the addressing space L for left hand side pointer is bound on the right side by the right hand side pointer x-axis position. These boundaries fluctuate dynamically in real-time as the pointers are moved around.

Utilizing the dynamic split approach it is possible to implement the invention in a variety of ways to achieve both absolute pointer management and relative pointer management. Several ways of doing this are illustrated below. The basic dynamic pointer management method illustrated in FIG. 6 continuously re-estimates the dynamic boundary so that the right and left pointers do not cross over into the other pointer's region. The mild pointer crossing method illustrated in FIG. 7 generally enforces the dynamic approach of the absolute pointer management method, but permits a mild overlap of each pointer into the other pointer's region. The pointer management method illustrated in FIG. 8 enforces the basic dynamic approach, with the added feature of imposing outer limit restrictions to improve further the effective pointer resolution. In the detailed explanations below, the absolute pointer management case is considered first, followed by a discussion of the relative pointer management case.

As will be understood from the description to follow, the dynamic boundary subdivides the common display space into a left region and a right region, where the dynamic boundary defines a right edge of the left region and a left edge of the right region. In the basic dynamic pointer management method, the dynamic boundary may be represented as a generally vertical, one-dimensional line, such that the left and right edges are coincident with one another (i.e., the left and right regions abut on another). In the mild overlap dynamic pointer management method, the dynamic boundary represents a boundary region of two dimensions (e.g., such as a rectangular region) that separates the left and right regions. In this mild overlap case, the left and right edges are spaced apart from one another, with the dynamic boundary region lying between.

Absolute Pointer Management

Basic Dynamic Boundary Method

As the result of dynamic boundaries, the remapping between touchpad coordinates and screen coordinates must be continuously re-estimated. The novel remapping method defines a set of desired properties and constraints to provide continuity and motion smoothness. The set below represents the core constraints:

(1) $Left\_Remap(TLLx(t))==SLLx(t)$
(2) $Left\_Remap(TLRx(t))==SLRx(t)$
(3) $SLRx(t)==SRx(t)$
(4) $SRx(t)==Right\_Remap(TRx(t))$
(5) $Right\_Remap(TRRx(t))==SRRx(t)$
(6) $Right\_Remap(TRLx(t))==SRLx(t)$
(7) $SRLx(t)==SLx(t)$
(8) $SLx(t)==Left\_Remap(TLx(t))$
(9) $SLRx(t)==SRx(t)$
(10) $SRLx(t)==SLx(t)$ The constraints (3) and (7) above create a variable stickiness which enables reachability and continuity. It is strongest at the right hand side of the left touchpad as well at the left hand side of the right touchpad. Assuming, for instance, that the user's finger position on the right touchpad is at TRLx, any movement of the left pointer will also move the right pointer. The stickiness fades out when the user's finger position on the right touchpad goes towards TRRx.

When a normalized space is used for touchpad and screen coordinates, respectively (i.e. TLLx=0.0, TRLx=0.0, SLLx=0.0, TLRx=1.0, TRRx=1.0 and SRRx=1.0), these equalities can be reformulated as follows:

(1) $Left\_Remap(0.0)==0.0$
(2) $Left\_Remap(1.0)==SLRx(t)$
(3) $SLRx(t)==SRx(t)$
(4) $SRx(t)==Right\_Remap(TRx(t))$
(5) $Right\_Remap(1.0)==1.0$
(6) $Right\_Remap(0.0)==SRLx(t)$
(7) $SRLx(t)==SLx(t)$
(8) $SLx(t)==Left\_Remap(TLx(t))$
(9) $SLRx(t)==SRx(t)$
(10) $SRLx(t)==SLx(t)$ An important consequence of these constraints is not to allow pointer crossing, but at the same time allow any pointer to address any desired position of the target screen area. A number of transformations having those target properties can be designed.

The preferred embodiment of this invention is defined by the following transformations for the left pointer and right pointer when using the normalized space:

$Left\_Remap(TLx(t))=0.5*TLx(t)+0.5*TRx(t)*TLx(t)$
$Right\_Remap(TRx(t))=0.5*TLx(t)+1.0*TRx(t)-0.5*TRx(t)*TLx(t)$ which can be expressed as the following matricial product:

$$\begin{bmatrix} SL_X(t) \\ SR_X(t) \end{bmatrix} = \text{Clip}\left(\begin{bmatrix} 0.5 & 0 & 0.5 & 0 \\ 0.5 & 1 & -0.5 & 0 \end{bmatrix} \times \begin{bmatrix} TL_X(t) \\ TR_X(t) \\ TL_X(t)*TR_X(t) \\ 1 \end{bmatrix}\right)$$

It corresponds to a specific quadratic systems of $$\begin{bmatrix} TL_X(t) \\ TR_X(t) \end{bmatrix}$$

where the square terms TLx(t)$^2$ and TRx(t)$^2$ are unused. The Clip( ) function clips values outside the range [0.0:1.0].

The equations presented above apply to two-finger interaction but can easily be extended to one-finger interaction. In the case where the left hand side finger is lifted from the touchpad's surface, the equations remain still valid by defining:

SLX(t)==0.0 t

Respectively, in the case where the right hand side finger is lifted from the touchpad's surface, the equations remain valid by defining:

SRX(t)==1.0 t

Other embodiments are based upon alternate constraints that are derived by relaxing some of the core constraints.

Mild Pointer Crossing Option

An alternate embodiment with a mild pointer crossing will use the following constraints:
(1) Left_Remap(TLLx(t))==SLLx(t)
(2) Left_Remap(TLRx(t))==SLRx(t)
(3) SLRx(t)==Min(1,SRx(t)+Offsetx)
(4) SRx(t)==Right_Remap(TRx(t))
(5) Right_Remap(TRRx(t))==SRRx(t)
(6) Right_Remap(TRLx(t))==SRLx(t)
(7) SRLx(t)==Max(0,SLx(t)−Offsetx)
(8) SLx(t)==Left_Remap(TLx(t))
(9) SLRx(t)==SRx(t)
(10) SRLx(t)==SLx(t)

The transformation for that embodiment will then be:

$$\begin{bmatrix} SL_X(t) \\ SR_X(t) \end{bmatrix} = \text{Clip}\left(\begin{bmatrix} 0.5+\alpha & 0 & 0.5 & 0 \\ 0.5 & 1+\alpha & -0.5 & -\alpha \end{bmatrix} \times \begin{bmatrix} TL_X(t) \\ TR_X(t) \\ TL_X(t)*TR_X(t) \\ 1 \end{bmatrix}\right)$$

where α represents the overlay control factor.

An alternate embodiment with outer limit restrictions will use the following constraints:
(1) Left_Remap(TLLx(t))==SLLx(t)
(2) Left_Remap(TLRx(t))==SLRx(t)
(3) SLRx(t)==Min(SRx(t), LimitLx)
(4) SRx(t)==Right_Remap(TRx(t))
(5) Right_Remap(TRRx(t))==SRRx(t)
(6) Right_Remap(TRLx(t))==SRLx(t)
(7) SRLx(t)==Max(SLx(t), LimitRx)
(8) SLx(t)==Left_Remap(TLx(t))
(9) SLRx(t)==SRx(t)
(10) SRLx(t)==SLx(t)

The transformation for that embodiment will then be:

$$\begin{bmatrix} SL_X(t) \\ SR_X(t) \end{bmatrix} = \text{Clip}\left(\begin{bmatrix} 0.5 & 0 & 0.5-\omega & 0 \\ 0.5-\omega & 1-\omega & -0.5+\omega & \omega \end{bmatrix} \times \begin{bmatrix} TL_X(t) \\ TR_X(t) \\ TL_X(t)*TR_X(t) \\ 1 \end{bmatrix}\right)$$

where ω represents the boundary control factor.

Relative Pointer Management

The above descriptions focused on the absolute pointing input mode. The following description will focus on the relative mode. In relative mode, the same non-crossing pointer constraints (i.e. dynamic boundary management) are preserved but touchpad finger motion is interpreted as an offset with respect to the current screen pointer position. The offset amount is in the preferred embodiment proportional to the width of the current screen area, that is to say, proportional to:

WLx(t)=SLRx(t)−SLLx(t) for the left pointer and to:

WRx(t)=SRRx(t)−SRLx(t) for the right pointer

The effect of this proportionality is 1) to enable a better designation precision when the screen area is smaller and 2) to enable a faster access when the screen area is larger. FIG. 9 shows the effect of a same swipe motion on the left and right touchpad which results in different offsets in the screen space. In relative mode, the displacement offset in the screen space illustrated is twice as important for the right pointer as for the left pointer for the same swipe motion on the respective touchpad since the width of right interactive area is twice as wide as the left interactive area.

Implementation Examples

The pointer management techniques described above can be implemented in a variety of different physical embodiments. By way of example, refer to FIG. 10, which illustrates how the remote control device of FIG. 1A may be implemented. As illustrated, touchpad A and touchpad B correspond to the clickable touchpads 20, 22 of FIG. 1A. These may be implemented as capacitive touch surfaces that are each mounted in a detent structure that allows the respective touch surface to be clicked by a pushing force applied normal to the touchpad surface. Such clicking motion activates a micro-switch mounted beneath the touch pad. The micro-switch provides a momentary binary signal each time the pad is clicked.

In the multi-touch embodiment of FIG. 1B, the multi-touch surface is able to individually detect and discriminate between contact from the right and left hands and thus provides a separate (x,y) position data point for each finger in contact with the touchpad surface. User selection of a desired (x,y) position may be effected by sensing a momentary tap by the user's finger, for example.

Figure 10:
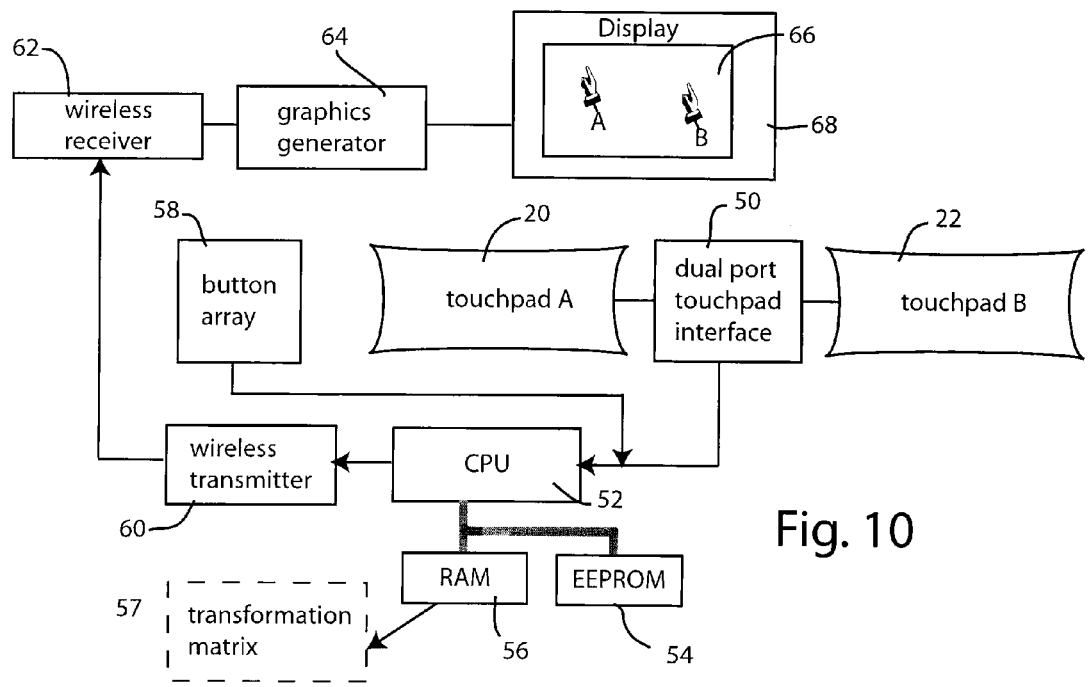
FIG. 10 is a hardware circuit block diagram of an exemplary embodiment of a control apparatus working in conjunction with a display screen.
Figure 11:
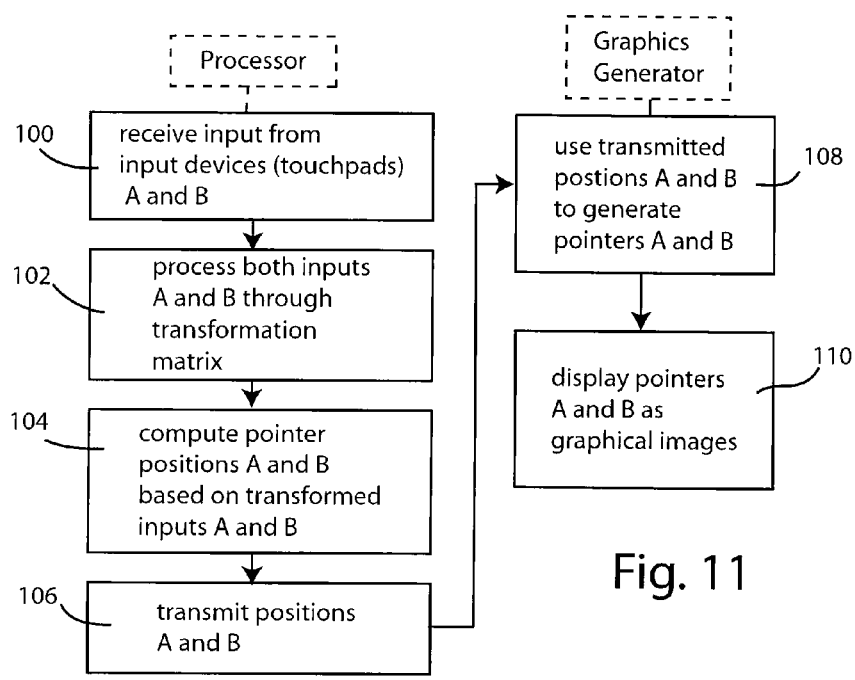
FIG. 11 is a flow chart diagram showing exemplary operations performed by the CPU (or processor) and graphics generator of FIG. 10 to effect the functionality provided by the control apparatus.

In the illustrated embodiment of FIG. 10, the touchpads A and B each provide a first output signal indicative of the (x,y) position where finger contact is made and a second output signal that carries the micro-switch click data. These outputs are fed to the dual port touchpad interface 50, which provides a digital interface to receive each of the output signals from each of the touchpads. The interface 50 associates identification or address data to the received signals, to distinguish signals of touchpad A (i.e., left hand touchpad 20 of FIG. 1A) from signals of touchpad B (i.e., right hand touchpad 22 of FIG. 1A). The address-associated data are fed from interface 50 to a serial input of the processor (CPU) 52. Processor (CPU) 52 may be implemented as a microcontroller, microprocessor, or the like. Coupled to the processor 52 is a first memory (e.g., EEPROM memory) 54 that stores the operating instructions that control how the processor functions. A flowchart diagram illustrating these instructions is shown in FIG. 11. To provide working memory to perform the matrix transformations described above, a suitable second memory (e.g., RAM memory) 56 is provided. In FIG. 10, the transformation matrix has been diagrammatically illustrated at 57.

Also coupled to the processor is the button array 58. The button array represents the set of application-definable buttons (buttons 24 of FIG. 1A). The button array may be implemented using suitable micro-switches, membrane switches or the like. The button array may be coupled to the processor 52 via the serial interface, as shown, or the individual buttons of the array may each be coupled via dedicated digital inputs of the processor (not shown).

To effect control over the pointer display system, the remote control device of FIG. 10 includes a wireless transmitter 60 which communicates with a corresponding wireless receiver 62. Wireless communication can be effected using radio frequency (RF) signals, infrared (IR) signals, or both. Based on the matrix transformations described above, the processor computes the respective positions for each of the pointers, using the mapping integrator functionality to compute the positions so that a dynamic boundary between the pointer is adjusted based on knowledge of the respective (x,y) positions of the touchpad output signals. The processor transmits these pointer position data via the transmitter 60 and receiver 62 to the graphics generator circuitry 64. The graphics generator circuitry is designed to generate graphical images of the respective pointers for display within the display space or display region 66 of a display device 68. The graphics generator thus supplies the bit-mapped or vector graphics data to render the image of the pointer. The point on the screen at which that image is rendered is based on information received wirelessly from the remote control device. Of course, if desired, a hardwired connection may be used between the processor 52 and the graphics generator 64. In such embodiment, the wireless transmitter and wireless receiver would not be used.

As an alternative to the processor-based embodiment described above, the controller circuitry described above can be implemented using an application specific integrated circuit (ASIC), if desired.

In the embodiments depicted above, the mapping integrator functionality is provided by the processor within the remote control device. However, if desired, the mapping integrator functionality can alternatively be placed in the controlled, consumer electronic device (e.g., set top box, television, computer system). In such an alternate embodiment, the position signals are transmitted to the controlled device and an on-board processor or ASIC associated with the controlled device performs the mapping integrator functionality.

FIG. 11 provides a flow diagram illustrating how the processor 52 is programmed and how the graphics generator 64 handles the instructions received from the processor. In step 100, the processor receives input from the input devices (in this case, touchpads A and B). These input values give touchpad coordinates (x,y) and have corresponding addresses denoting which touchpad supplied the data.

In step 102, the processor processes these input data by constructing a transformation matrix 57 in RAM based on the transformation matrix model being used. The written description above has explained in detail various different transformation matrices that may be used based on the desired behavior of the system (absolute-relative; basic, mild pointer crossing enabled, with/without outer limit constraints). It will be understood that the processor computes the pointer positions by performing matrix multiplication of the input data, based on the matrix used.

Thus, in step 104 the processor computes the pointer positions of the respective pointer positions based on the transformed inputs that were processed by the transformation matrix. These pointer positions are then mapped into the display space of the display screen using the common coordinate system of the display space.

In step 106, the pointer positions are then transmitted to the graphics generator. The graphics generator 64 then performs the following steps:

In step 108, graphical images are generated for each pointer to be displayed. As stated above, these graphical images can be generated using bitmapped graphics, where the pointer images are pre-stored in memory, or by using vector graphic techniques to generate the images on the fly. In either case, the images are placed on the display screen at locations within the common display space of the screen based on the locations specified in step 104, as depicted at step 110.

Functional Analysis of Dynamic Controller Methods

From a functional perspective, the dual pointer (or multi-pointer) management approach uses data from both (all) input devices to compute the respective positions of both (all) of the pointers. In effect, the input data are cross-coupled via the transformation matrix, so that the computed pointer positions are interdependent. In this way, the system generates a dynamic boundary within the common display coordinate system, where the dynamic boundary is adjusted by the processor based on knowledge of the respective position signals from the input devices.

Figure 12:
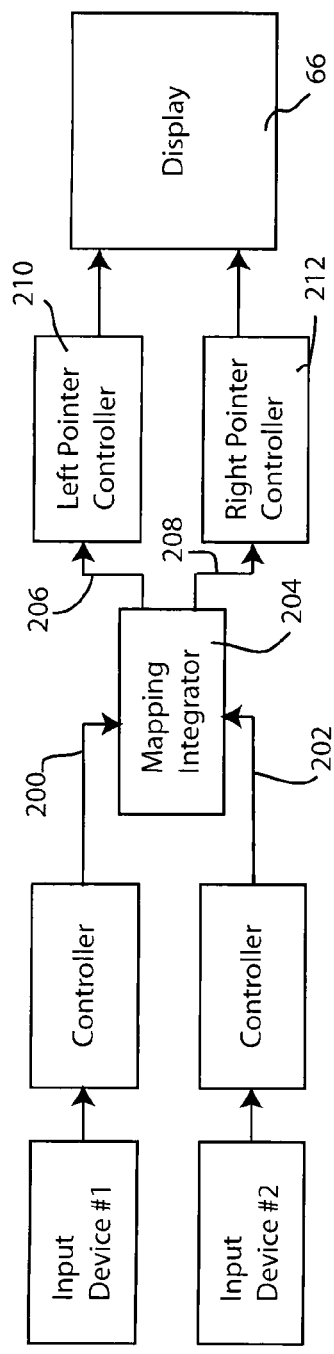
FIG. 12 is a functional block diagram illustrating the exemplary functionality of a control apparatus for generating plural pointers on a display screen.

To illustrate, see FIG. 12, which presents a functional block diagram of a pointer control apparatus in accordance with the disclosed innovations. Note that the input devices (device #1 and device #2) and their associated controllers each supply a position signal, on signal lines 200 and 202, respectively. These are fed to the mapping integrator that generates pointer position data for the left pointer and right pointer on data lines 206 and 208, respectively. These pointer position data are then used by the left pointer controller 210 and right pointer controller 212 to generate the respective left and right pointers for display within the display space 66. The mapping integrator computes the position of the first pointer within the display coordinate system based in part upon the position signal of the first input device and based in part upon the position signal of the second input device, and computes the position of the second pointer within the display coordinate system based in part upon the position signal of the second input device and based in part upon the position signal of the first input device.

Figure 13:
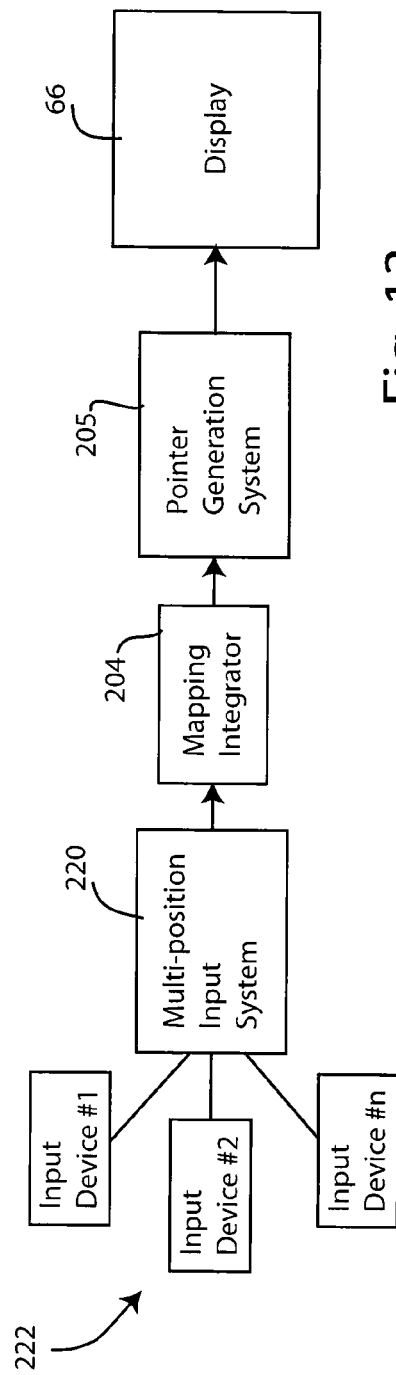
FIG. 13 is a functional block diagram illustrating an alternate embodiment of the control apparatus that employs a multi-position input system.

By way of further illustration, refer to FIG. 13, which shows a multi-device system. In this example, three input devices are illustrated, but it will be understood that the multi-device system can have any plural number of input devices (i.e, 2 or more input devices). In this embodiment, a single multi-position input system is employed. This system receives input position signals from each of the input devices 222 and supplies data representing these input signals to the mapping integrator 204. The multi-position input system receives each of the input device signals and appends address information to each so that the data take the form of (addr, x, y). These data are then sent in a serial stream to the mapping integrator 204. The mapping integrator functions as described above to generate the respective pointer position signals. In addition, the mapping integrator also appends pointer identification tags to each of the pointer positions calculated. The output of the mapping integrator thus takes the form of (pointer tag, x, y) where the pointer tag indicates to which pointer the data corresponds (left, right, middle, etc.) and the x,y values represent positions within the common display coordinate system (i.e., within the display space). The pointer generation system 205 receives the output data of the mapping integrator, parses the data by pointer tag and then generates and displays the pointer images within the display space.

Conclusion

From the foregoing, it will be appreciated that the present innovation employs novel dynamic boundary control techniques to solve many problems arising in multi-pointer control applications. The innovation enables a more intuitive interaction model for dual pointer-based input which is based on a non-crossing (or mildly crossing) pointer approach and that allows users to use any pointer to reach any area of the display. The input devices can be any pointing device that provides at least one degree or more of movement, such as touchpads, touch screens and joysticks. The innovation also provides input speed advantages when compared to traditional input methods due its dynamic precision/flexibility tradeoff management.

Typical applications for dual pointer input are text entry using a virtual keyboard displayed on screen, or multiple object selection tasks, for instance. The dual pointer techniques are also well suited to gaming applications as well.

The description of the invention is merely exemplary in nature and, thus, variations that do not depart from the gist of the invention are intended to be within the scope of the invention. Such variations are not to be regarded as a departure from the spirit and scope of the invention. For example, while the matricial transformation (using a transformation matrix) has been utilized in some of the embodiments described herein, other ways of performing these transformations may alternatively be employed.

What is claimed is:

1. A pointer control apparatus comprising:
    a first input device that provides a position signal expressed using a first coordinate system associated with the first input device;
    a second input device that provides a position signal expressed using a second coordinate system associated with the second input device;
    a pointer generation system that generates for display in a common display space having a common display coordinate system a first pointer associated with the first input device and a second pointer associated with the second input device;
    a mapping integrator processor configured to compute the position of the first pointer within the display coordinate system based in part upon the position signal of the first input device and based in part upon the position signal of the second input device, and configured to compute the position of the second pointer within the display coordinate system based in part upon the position signal of the second input device and based in part upon the position signal of the first input device;
    the mapping integrator processor being further configured to compute the position of the first and second pointers such that each is confined to a different side of a dynamic boundary within the common display coordinate system, where the dynamic boundary is adjusted by the processor based on knowledge of the respective position signals of the first and second input devices.

2. The pointer control apparatus of claim 1 wherein the dynamic boundary subdivides the common display space into two non-overlapping contiguous regions where the union of the two regions equals the common display space.

3. The pointer control apparatus of claim 1 wherein the dynamic boundary subdivides the common display space into two partially overlapping contiguous regions.

4. The pointer control apparatus of claim 1 wherein the dynamic boundary subdivides the common display space into two contiguous regions that are statically constrained along their dynamic extremities.

5. The pointer control apparatus of claim 1 wherein the first input device provides a left position signal and the second input device provides a right position signal;
    wherein the dynamic boundary subdivides the common display space into a left region and a right region, said dynamic boundary defining a right edge of said left region and a left edge of said right region; and
    wherein the mapping integrator processor computes said right edge based on the right position signal and computes said left edge based on the left position signal.

6. The pointer control apparatus of claim 5 wherein said left and right edges are coincident with one another.

7. The pointer control apparatus of claim 5 wherein said left and right edges are spaced apart from on another.

8. The pointer control apparatus of claim 1 wherein said first and second input devices operate independently of one another.

9. The pointer control apparatus of claim 1 wherein said first and second input devices generate position signals using sensors of the same type.

10. The pointer control apparatus of claim 1 wherein said first and second input devices generate position signals using sensors of different types.

11. The pointer control apparatus of claim 1 further comprising at least one additional input device that provides an additional input signal;
    wherein said pointer generation system generates a pointer associated with said additional input device; and
    wherein said mapping integrator processor computes the position of the pointer associated with said additional input device based on the position signals of the first and second input devices as well as the additional input signal.

12. The pointer control apparatus of claim 1 wherein at least one of said first and second coordinate systems is a one-dimensional coordinate system.

13. The pointer control apparatus of claim 1 wherein at least one of said first and second coordinate systems is a two-dimensional coordinate system.

14. The pointer control apparatus of claim 1 wherein at least one of said first and second coordinate systems is a three-dimensional coordinate system.

15. The pointer control apparatus of claim 1 wherein said mapping integrator processor performs at least one transformation.

16. The pointer control apparatus of claim 4 wherein said mapping integrator processor performs at least one transformation that includes an overlay control factor that permits both first and second pointers to simultaneously occupy said intermediate region.

17. The pointer control apparatus of claim 1 wherein said mapping integrator processor performs at least one transformation that includes an outer limit restriction whereby predefined positions of the first and second input devices are not mapped to the display coordinate system.

18. The pointer control apparatus of claim 1 wherein said processor is selected from the group consisting of microprocessor, microcontroller, digital signal processor, computer, and application specific integrated circuit (ASIC).

19. The pointer control apparatus of claim 1 wherein said processor is embedded in at least one of said first and second input devices.

20. The pointer control apparatus of claim 1 wherein said processor is configured by program instructions stored in a machine-readable memory coupled to said processor.

21. A method of generating plural pointers on a display screen that are responsive to plural input devices, comprising:
   electronically receiving a first position signal from a first input device;
   electronically receiving a second position signal from a second input device;
   electronically processing said first and second position signals to calculate first and second pointer positions within a predefined display coordinate system associated with a display screen, the first and second pointer positions being different from one another and each being based on both said first and second position signals;
   generating and displaying first and second pointers on said display screen, the first pointer being displayed at said first pointer position and the second pointer being displayed at said second pointer position;
   wherein said processing step is performed such that the first and second pointer positions are confined to different sides of a dynamic boundary within the display coordinate system, wherein the dynamic boundary is computationally adjusted based on the first and second position signals.

22. The method of claim 21 wherein said first position signal is a left position signal and the second position signal is a right position signal;
   wherein said processing step is performed such that said dynamic boundary subdivides a display space into a left region and a right region, said dynamic boundary defining a right edge of said left region and a left edge of said right region; and
   wherein said processing step further includes computing said right edge based on the right position signal and computing said left edge based on the left position signal.

23. The method of claim 21 wherein said processing step is performed by applying a transformation of said first and second position signals.

24. The method of claim 21 wherein said processing step is performed by applying a transformation that defines a quadratic relationship among the first and second position signals.

25. The method of claim 21 wherein said processing step is performed by applying a transformation that defines a quadratic relationship among the first and second position signals and that includes an overlay control factor that permits said first and second pointer positions to occupy a common intermediate region associated with said dynamic boundary.

26. The method of claim 21 wherein said first and second input devices each have an associated range of selectable positions; and
   wherein said processing step is performed by applying a transformation that defines a quadratic relationship among the first and second position signals and that includes an outer limit restriction whereby predefined portions of the associated ranges of said first and second input devices are not mapped to the display coordinate system.

27. The method of claim 21 wherein said processing step is performed to define a dynamic linear boundary that subdivides the display screen into two contiguous regions.

28. The method of claim 21 wherein said processing step is performed to define a dynamic curvilinear boundary that subdivides the display screen into two contiguous regions.

29. The method of claim 21 wherein said processing step is performed to define a dynamic boundary that comprises an intermediate region that subdivides the display screen into two contiguous regions on opposite sides of the intermediate region.

30. The method of claim 21 wherein said electronically processing is performed using a device selected from the group consisting of microprocessor, microcontroller, digital signal processor, computer, and application specific integrated circuit (ASIC).

31. An apparatus for generating plural pointers on a display screen comprising:
   a multi-position input system receptive of position input data from a plurality of input devices;
   a pointer generation system that generates plural pointers for display on said display screen each at a different pointer location;
   a mapping integrator processor configured to compute said different pointer locations by taking into account the position input data from all of said plurality of input devices in computing each pointer location;
   the mapping integrator processor being further configured to compute said different pointer locations such that each location lies on a different side of a dynamic boundary that is adjusted by the processor based on knowledge of the input data from said plurality of input devices.

* * * * *

UNITED STATES PATENT AND TRADEMARK OFFICE
CERTIFICATE OF CORRECTION

| | | |
|---|---|---|
| PATENT NO. | : 8,188,969 B2 | Page 1 of 1 |
| APPLICATION NO. | : 12/687930 | |
| DATED | : May 29, 2012 | |
| INVENTOR(S) | : Philippe Morin et al. | |

It is certified that error appears in the above-identified patent and that said Letters Patent is hereby corrected as shown below:

In column 12, line 25, claim 7, the word "on" should read -- one --

Signed and Sealed this
Second Day of October, 2012

David J. Kappos
*Director of the United States Patent and Trademark Office*